United States Patent
Tomioka

(10) Patent No.: US 11,061,627 B2
(45) Date of Patent: Jul. 13, 2021

(54) SERVER SYSTEM, PRINTING APPARATUS, CONTROL METHOD, AND COMMUNICATION SYSTEM

(71) Applicant: CANON KABUSHIKI KAISHA, Tokyo (JP)

(72) Inventor: Yu Tomioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/938,185

(22) Filed: Jul. 24, 2020

(65) Prior Publication Data
US 2020/0356319 A1    Nov. 12, 2020

Related U.S. Application Data
(63) Continuation of application No. 16/439,478, filed on Jun. 12, 2019, now Pat. No. 10,761,784.

(30) Foreign Application Priority Data

Jun. 15, 2018    (JP) .............................. JP2018-114705

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |

(52) U.S. Cl.
CPC .......... *G06F 3/1207* (2013.01); *G06F 3/1259* (2013.01); *H04N 1/00403* (2013.01); *H04N 1/00488* (2013.01)

(58) Field of Classification Search
CPC . G06F 3/1207; G06F 3/1259; H04N 1/00403; H04N 1/00488
USPC ............................... 358/1.15, 1.14, 1.13, 1.1
See application file for complete search history.

(56) References Cited

U.S. PATENT DOCUMENTS

| | | | | |
|---|---|---|---|---|
| 2009/0030775 A1* | 1/2009 | Vieri | ...................... | G06Q 30/02 705/14.54 |
| 2017/0063276 A1* | 3/2017 | Zhi | ...................... | G01R 31/343 |

* cited by examiner

*Primary Examiner* — Douglas Q Tran
(74) *Attorney, Agent, or Firm* — Canon U.S.A., Inc. IP Division

(57) ABSTRACT

The present invention offers a system including a transmission unit configured to transmit, based on a reception of predetermined information, first notification information for causing an audio control device to audibly notify a user of a first message related to a printing apparatus, and second notification information for causing a terminal device outside the audio control device and outside the printing apparatus to notify, through a notification screen, the user of a second message related to the printing apparatus and including a message not included in the first message.

24 Claims, 13 Drawing Sheets

FIG.11

| PRIORITY | ERROR CONTENT | MESSAGE |
|---|---|---|
| HIGH | COVER OPEN | PRINTER COVER IS OPEN. CLOSE THE COVER. |
| ↑ | PAPER JAM | PAPER JAM OCCURRED. |
| MIDDLE | OUT OF PAPER | PAPER RAN OUT. SET PAPER. |
| ↓ | BUSY | PRINTER IS OPERATING. WAIT A WHILE. |
| LOW | OFFLINE | PRINTER IS OFFLINE. CHECK WHETHER POWER IS TURNED ON. |

FIG.12

| PRIORITY | INK STATUS | MESSAGE |
|---|---|---|
| HIGH | OUT-OF-INK STATE | THE FOLLOWING INK RAN OUT: |
| MIDDLE | SMALL-INK-AMOUNT STATE 1 | THE FOLLOWING INK WILL SOON RUN OUT: |
| LOW | SMALL-INK-AMOUNT STATE 2 | REMAINING AMOUNT OF THE FOLLOWING INK IS SMALL: |
| LOWEST | NORMAL STATE | ----- |

FIG.13A

WELCOME TO PRINTING SERVICE

YOU CAN PRINT COLORING AND NUMBER PLACE ON PRINTER AND CHECK PRINTER STATUS AND REMAINING INK AMOUNT.

THE FOLLOWING CONTENTS CAN BE PRINTED: COLORING, NUMBER PLACE, WRITING PAPER, STAFF NOTATION, AND CHECK LIST

FIG.13B

PRINTING WRITING PAPER ...

TO PRINT WRITING PAPER IN AN EASY WAY, SPEAK TO SMART SPEAKER AS FOLLOWS: "CALL PRINTER AND PRINT WRITING PAPER"

FIG.13C

PRINTER STATUS CHECK COMPLETED

PRINTER COVER IS OPEN. CLOSE THE COVER.

THE FOLLOWING INK RAN OUT:
MAGENTA M001

REMAINING AMOUNT OF THE FOLLOWING INK IS SMALL:
YELLOW Y001

SERVER SYSTEM, PRINTING APPARATUS, CONTROL METHOD, AND COMMUNICATION SYSTEM

CROSS-REFERENCE TO RELATED APPLICATIONS

This application is a continuation, and claims the benefit of U.S. patent application Ser. No. 16/439,478, presently pending, filed on Jun. 12, 2019, which claims the benefit of, and priority to, Japanese Patent Application No. 2018-114705 filed Jun. 15, 2018, which are hereby incorporated by reference herein in their entireties.

BACKGROUND OF THE INVENTION

Field of the Invention

The present invention relates to a server system, a printing apparatus, a control method, and a communication system.

Description of the Related Art

A notification system is known to notify a user of messages related to a printing apparatus.

Japanese Patent Application Laid-Open No. 2016-170631 discusses a technique in which, if an error occurs in a printer during printing based on a print job transmitted from an information processing apparatus, a toast for notifying a user of a status of the printer is displayed in a display unit of the information processing apparatus.

With the increase in the use of notification systems for notifying a user of messages related to a printing apparatus, a notification method with higher usability is demanded.

The present invention is directed to improving the usability in notification of messages related to a printing apparatus.

SUMMARY OF THE INVENTION

A communication system including a printing apparatus for performing print processing by applying a recording agent onto a recording medium via a printing unit, and a server system that communicates with the printing apparatus includes a first transmission unit configured to transmit information for causing the printing apparatus to perform the print processing, a printing unit configured to perform the print processing based on information for causing the printing apparatus to perform the print processing, a reception unit configured to receive predetermined information based on a predetermined speech instruction given to the audio control device, a second transmission unit configured to transmit, based on a reception of the predetermined information, first notification information for causing the audio control device to audibly notify a user of a first message related to the printing apparatus, and a third transmission unit configured to transmit, based on the reception of the predetermined information, second notification information for causing a terminal device outside the audio control device and outside the printing apparatus to notify, through a notification screen, the user of a second message related to the printing apparatus and including a message not included in the first message. When the first notification information is transmitted, the first message is audibly notified to the user by the audio control device. When the second notification information is transmitted, the second message is notified to the user through the notification screen by the terminal device.

Further features of the present invention will become apparent from the following description of embodiments with reference to the attached drawings.

BRIEF DESCRIPTION OF THE DRAWINGS

FIG. 11 illustrates an example of a priority table in which priorities of error states are defined.

FIG. 12 illustrates an example of a priority table in which priorities of ink states are defined.

FIGS. 13A, 13B, and 13C illustrate examples of notification screens displayed on a display unit.

DESCRIPTION OF THE EMBODIMENTS

Preferable embodiments of the present invention will be described in detail below with reference to the accompanying drawings. The following embodiments do not limit the present invention set forth in the appended claims. Not all of the combinations of the features described in the present embodiment are indispensable to the solutions for the present invention. Each of the embodiments of the present invention described below can be implemented solely or as a combination of a plurality of the embodiments or features thereof where necessary or where the combination of elements or features from individual embodiments in a single embodiment is beneficial.

<System Configuration>

Figure 1:
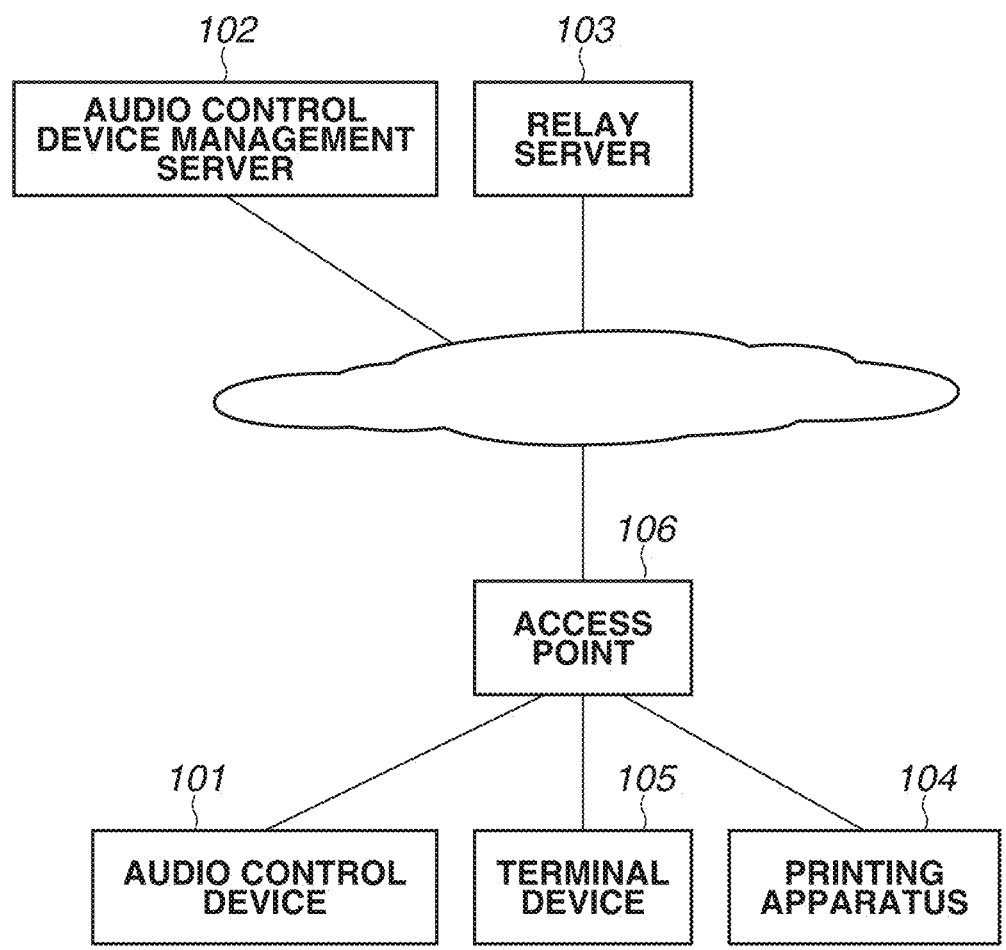
FIG. 1 illustrates an example of a configuration of a communication system.

FIG. 1 illustrates an example of a configuration of a communication system according to a first embodiment. The communication system according to the present embodiment includes, for example, an audio control device 101, an audio control device management server (hereinafter referred to as a management server) 102, a relay server 103, a printing apparatus 104, a terminal device 105, and an access point (AP) 106. The audio control device 101 is, for example, a smart speaker. The terminal device 105 is, for example, an arbitrary terminal device such as a smartphone, personal computer (PC), tablet computer, mobile phone, and personal digital assistant (PDA). In the following descriptions, the terminal device 105 is a smartphone. The printing apparatus 104 is a communication apparatus according to the present embodiment and is a printer for forming (printing) an image on a recording medium such as paper by applying a recording agent such as ink onto the recording medium. The printing apparatus 104 may be a multifunction peripheral having a plurality of functions including a copy function, a FAX function, and a print function. In the present embodiment, the printing apparatus 104 is assumed to be an apparatus for performing printing with an ink-jet method, but the present invention is not limited to this configuration. The printing apparatus 104 may be, for example, an apparatus for performing printing with an electrophotographic method or a heat sublimation system. In the present embodiment, the printing apparatus 104 is used as an example of a communication apparatus, but the present invention is not limited thereto. For example, a copying machine, facsimile machine, smartphone, mobile phone, tablet computer, PDA, digital camera, music playback device, storage device, projector, PC, and other apparatuses capable of offering services other than printing are also applicable. An access point (AP) 106 is, for example, a wireless local area network (LAN) router. An apparatus connected to the AP 106 can use the Internet via the AP 106. According to the present embodiment, the audio control device 101, the printing apparatus 104, and the terminal device 105 wirelessly connect with the AP 106 in accordance with a wireless communication method of a wireless LAN conforming to the Institute of Electrical and Electronics Engineers (IEEE) 802.11 standard series.

The audio control device 101 and the terminal device 105 are capable of communicating with the management server 102 via the AP 106 and the Internet. The printing apparatus 104 is capable of communicating with the relay server 103 via the AP 106 and the Internet. The audio control device 101 and the terminal device 105 are capable of connecting (communicating) with each other via the AP 106. In the communication system illustrated in FIG. 1, the audio control device 101, the printing apparatus 104, and the terminal device 105 are in connection with the same AP 106 to be able to use the Internet, but the present invention is not limited to this configuration. For example, the audio control device 101, the printing apparatus 104, and the terminal device 105 may be in connection with respectively different APs 106 to be able to use the Internet. In addition, the audio control device 101, the printing apparatus 104, and the terminal device 105 may be able to use the Internet, for example, via a mobile communication network such as Long Term Evolution (LTE) and 4th Generation (4G), without using the AP 106.

Figure 2:
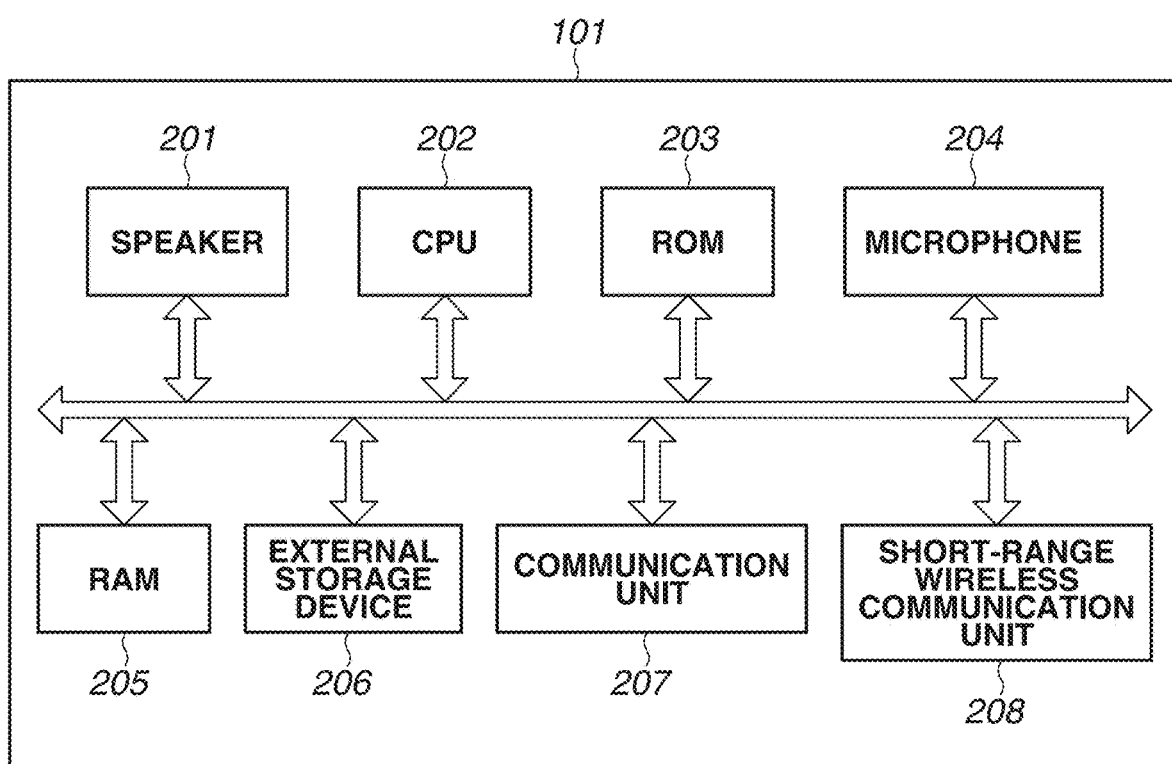
FIG. 2 is a block diagram illustrating a hardware configuration of an audio control device.
Figure 3:
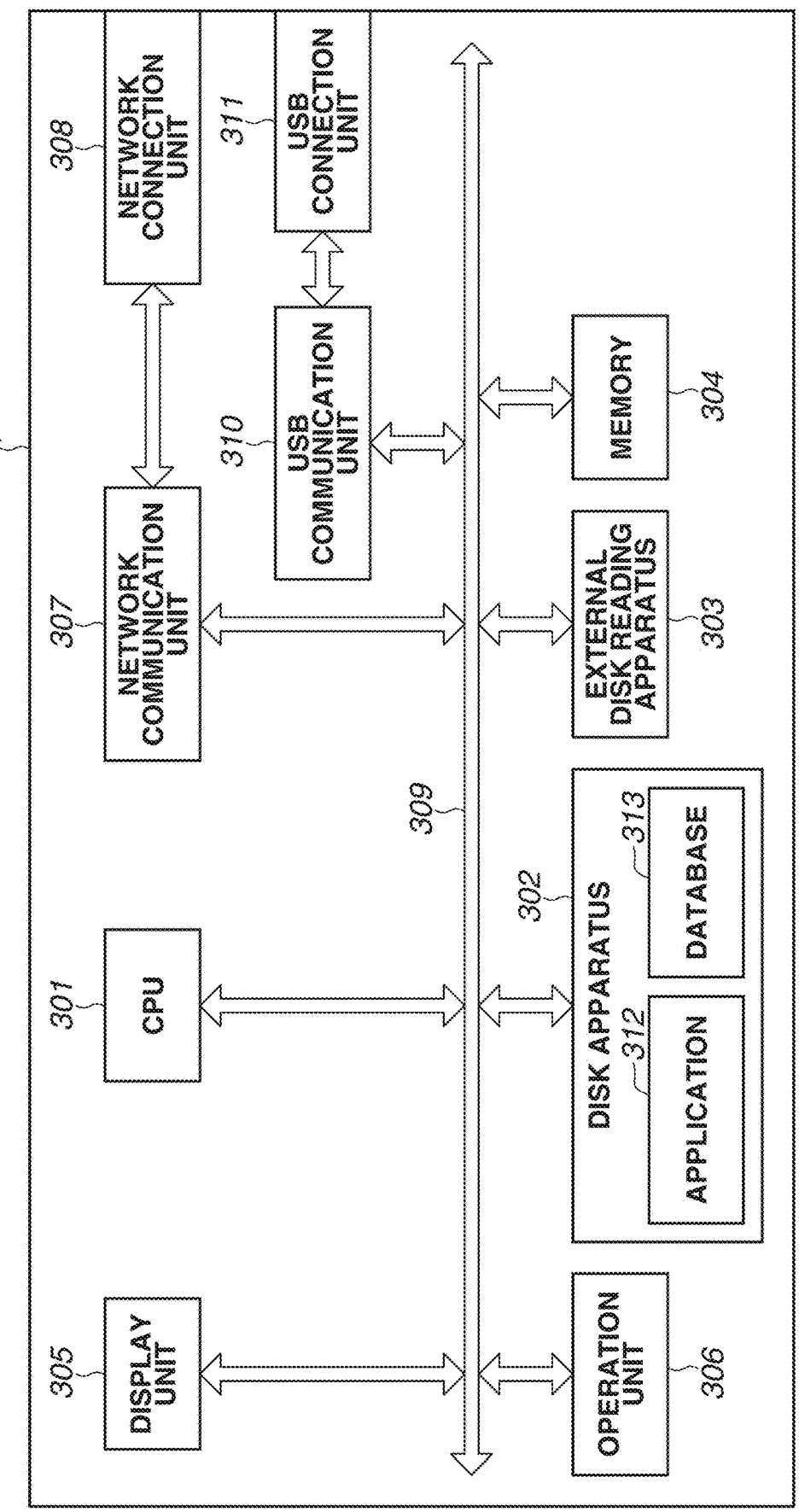
FIG. 3 is a block diagram illustrating a hardware configuration of a management server and a relay server.
Figure 4:
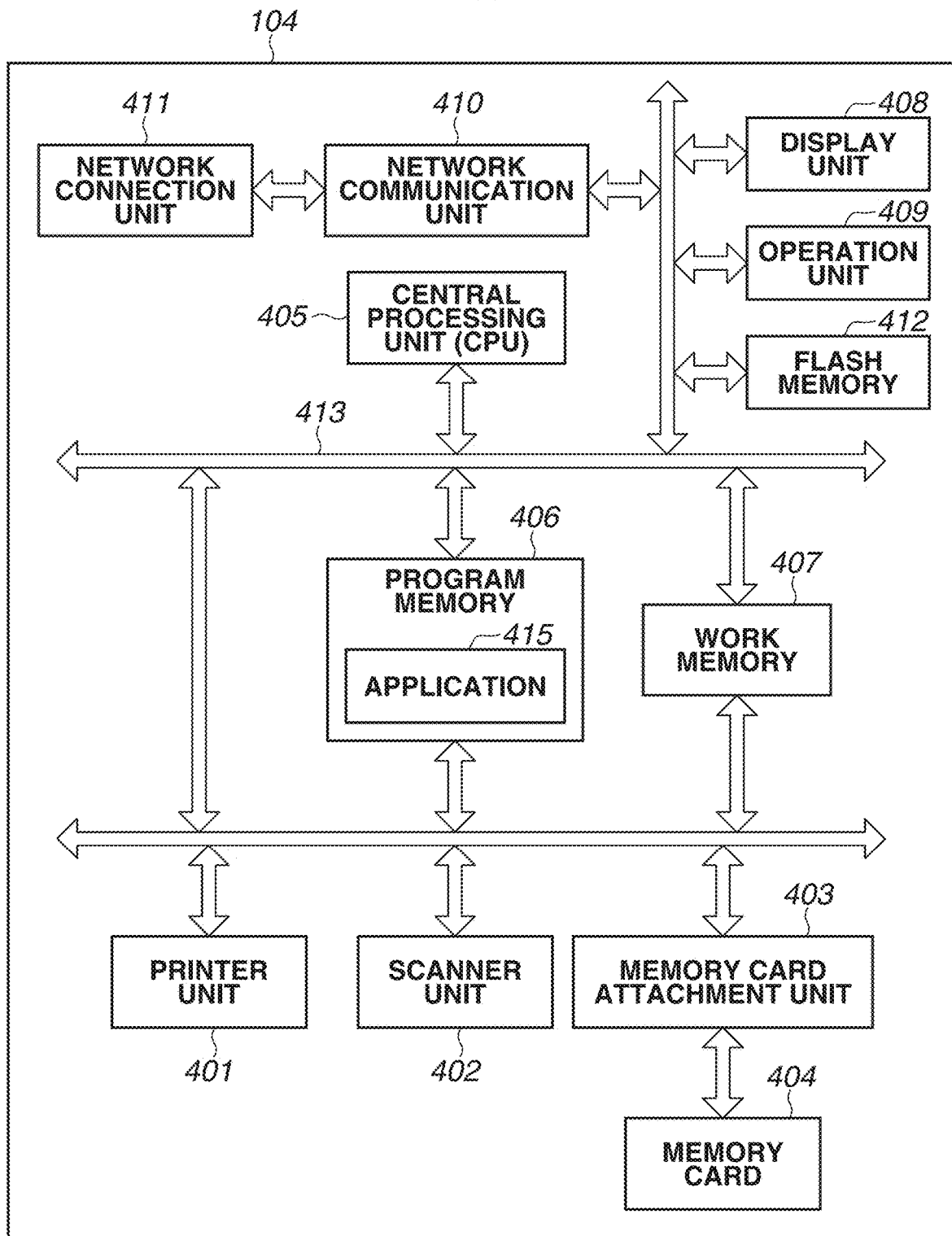
FIG. 4 is a block diagram illustrating a hardware configuration of a printing apparatus.

FIG. 2 is a block diagram illustrating an overview of a hardware configuration of the audio control device 101. The audio control device 101 includes a speaker 201, a central processing unit (CPU) 202, a read only memory (ROM) 203, a microphone 204, a random access memory (RAM) 205, an external storage device 206, a communication unit 207, and a short-range wireless communication unit 208. The blocks illustrated in FIGS. 2 to 4 are connected with each other, for example, via an internal bus. These configurations are to be considered as examples, and each apparatus may include hardware components in addition to the illustrated ones. In addition, the plurality of blocks illustrated in FIGS. 2 to 4 may be integrated into one block, or any one block may be divided into two or more blocks. More specifically, each apparatus can be configured in any way as long as processing to be described below is executable.

The speaker 201 generates audio through processing (described below). The CPU 202 is a system control unit and serves as a processor for controlling the entire audio control device 101. The ROM 203 stores control programs to be executed by the CPU 202, and fixed data such as data tables and embedded operating system (OS) programs. According to the present embodiment, the control programs stored in the ROM 203 are used to perform scheduling, task switching, interruption processing, and other software execution control under the management of the embedded OS stored in the ROM 203. The microphone 204 receives audio around the audio control device 101. For example, the microphone 204 receives voice uttered by a user. The RAM 205 is, for example, a static RAM (SRAM) which requires a backup power source. Since data in the RAM 205 is retained by a primary battery for data backup (not illustrated), the RAM 205 can store program control variables and data in a nonvolatile way. The RAM 205 includes a memory area for storing setting information and management data for the audio control device 101. The RAM 205 is also used as the main memory of the CPU 202 and as a work memory. The external storage device 206 stores application software.

The communication unit 207 includes a circuit and an antenna for performing communication in accordance with a predetermined wireless communication method. For example, the communication unit 207 can wirelessly connect with an access point. The communication unit 207 also operates as an access point to be temporarily used. Wireless communication according to the present embodiment may be capable of operating in accordance with a wireless communication method of a wireless LAN conforming to the IEEE802.11 standard series (Wi-Fi) or may be capable of operating in accordance with other wireless communication methods.

The short-range wireless communication unit 208 performs short-range wireless communication with other apparatuses existing within a range of a fixed short distance from the audio control device 101. The short-range wireless communication unit 208 performs communication based on a wireless communication method different from the method employed by the communication unit 207. According to the present embodiment, the short-range wireless communication unit 208 operates in accordance with the Bluetooth (registered trademark) standard, but other such methods may be used.

Figure 5:
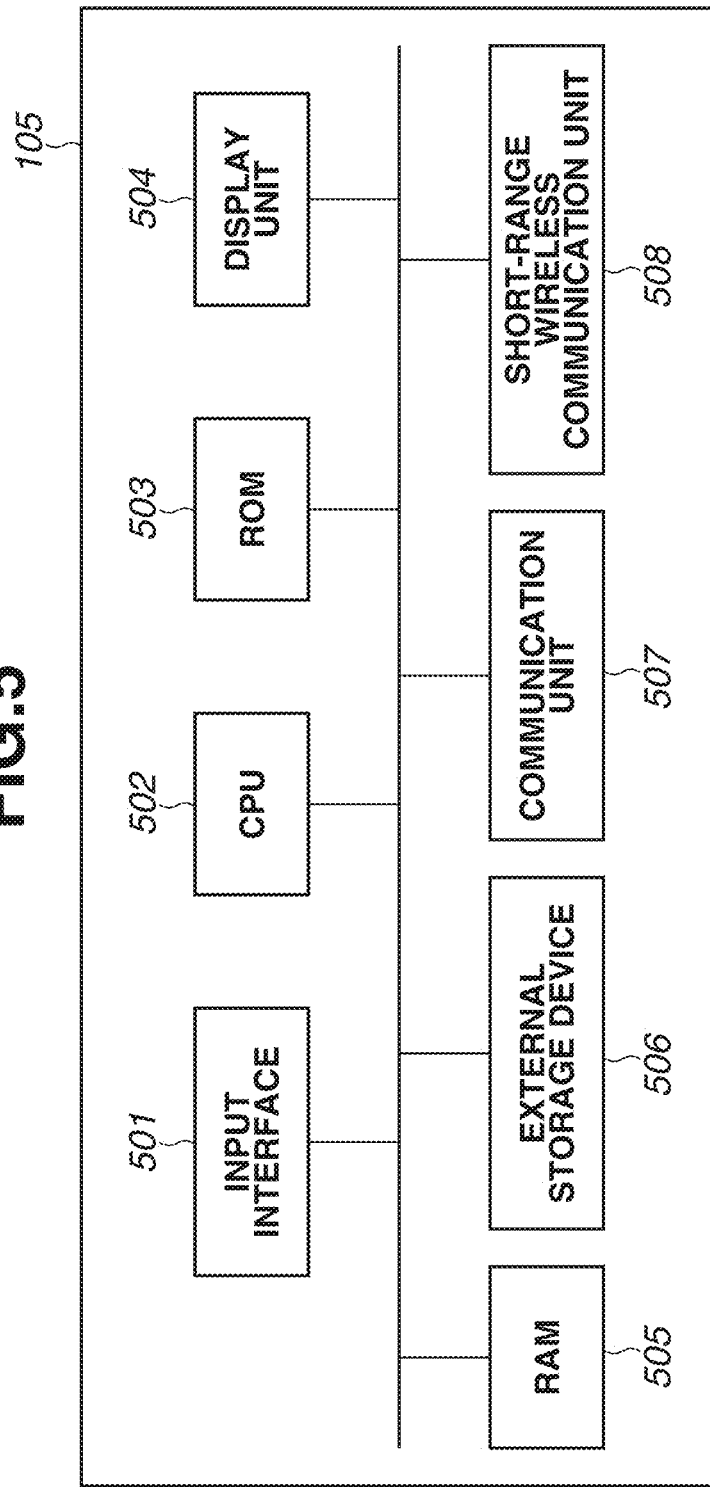
FIG. 5 is a block diagram illustrating an overview of a hardware configuration of a terminal device.

FIG. 5 is a block diagram illustrating an overview of a hardware configuration of the terminal device 105. The terminal device 105 includes, for example, an input interface 501, a CPU 502, a ROM 503, a display unit 504, a RAM 505, an external storage device 506, a communication unit 507, and a short-range wireless communication unit 508. These blocks are connected with each other, for example, via an internal bus.

The CPU 502 is a system control unit for controlling the entire terminal device 105. Like the RAM 205, the RAM 505 includes a dynamic RAM (DRAM) which requires a backup power source. The RAM 505 is also used as the main memory of the CPU 502 and a work memory. The ROM 503 stores control programs to be executed by the CPU 502, and fixed data such as data tables and OS programs. The present embodiment is on the premise that, in the terminal device 105, application programs for the audio control device 101 (hereinafter referred to as audio control applications) are installed and stored in the ROM 503.

The display unit 504 including light emitting diodes (LEDs) or a liquid crystal display (LCD) displays screens based on various types of data. The display unit 504 may include a touch display and have a function of receiving various inputs from the user. More specifically, the display unit 504 is an interface for receiving data inputs and operation instructions from the user. The display unit 504 may be an operation panel including a physical keyboard, buttons, and a touch panel. The communication unit 507 having a similar function to the above-described communication unit 207 is capable of wirelessly connecting with other apparatuses via the AP 106. The short-range wireless communication unit 508 is an apparatus capable of performing short-range wireless communication with the short-range wireless communication unit 208 by using the same wireless communication method as the method employed by the short-range wireless communication unit 208.

FIG. 3 is a block diagram illustrating an overview of a hardware configuration of the management server 102 and the relay server 103. In the present embodiment, each of the management server 102 and the relay server 103 includes one server, but a plurality of servers operating in association with each other may configure a server system corresponding to the management server 102 and the relay server 103.

A CPU 301 is a processor for controlling the following units. A disk apparatus 302 stores an application program 312, a database 313, an OS, and various files to be read by the CPU 301. An external storage media reading apparatus 303 is apparatus for reading information such as files stored in an external storage medium such as a secure digital (SD) card. A memory 304 including a RAM is used by the CPU 301 to temporarily store and buffer data as required. A display unit 305 including LEDs or an LCD displays screens based on various types of data. An operation unit 306 includes a keyboard, a mouse, etc. used by the user to perform various input operations. A network communication unit 307 is connected with a network such as the Internet via a network connection unit 308 to perform various types of communications. The network communication unit 307 performs communication via a wired LAN or wireless LAN. In a case where the network communication unit 307 supports a wired LAN, the network connection unit 308 is a connector for connecting a wired LAN cable. In a case where the network communication unit 307 supports a wireless LAN, the network connection unit 308 is an antenna. The network connection unit 308 may support both a wired LAN and a wireless LAN. A Universal Serial Bus (USB) communication unit 310 is connected with various peripheral apparatuses via a USB connection unit 311 to perform various types of communications based on the USB standard. The above-described units are connected with each other via a bus 309. Processing of the management server 102 and the relay server 103 (described below) is implemented when the CPU 301 reads and executes a program required for processing.

FIG. 4 is a block diagram illustrating an overview of a hardware configuration of the printing apparatus 104.

In the printing apparatus 104, the print function is implemented by a printer unit 401, a scanner function is implemented by a scanner unit 402, and a storage function is implemented by a memory card attachment unit 403 and a memory card 404.

The printer unit 401 performs printing based on image data received from the outside and image data stored in the memory card 404. The printer unit 401 also manages ink information such as the ink remaining amount and paper information such as the paper remaining amount.

The scanner unit 402 optically reads a document set on a document plate (not illustrated), converts read data into electronic data, converts the electronic data into image data with a specified file format, and transmits the image data to an external apparatus via a network or stores the image data in a storage area such as a hard disk drive (HDD) (not illustrated). The copy function is implemented when the scanner unit 402 reads a document placed on the document plate to generate image data and transmits the generated image data to the printer unit 401 which then prints an image based on the image data on a print sheet.

The memory card 404 attached to the memory card attachment unit 403 stores various types of file data. These pieces of file data may be read from an external apparatus via a network and then edited. In addition, file data can be stored from an external apparatus to the memory card 404.

The printing apparatus 104 includes a CPU 405, a program memory 406, a work memory 407, a display unit 408, an operation unit 409, a network communication unit 410, a network connection unit 411, and a flash memory 412. The CPU 405 is a processor for controlling the above-described units in the printing apparatus 104. The program memory 406 including a ROM stores various types of program codes and an application 415 for communicating with the relay server 103. The application 415 accesses the printer unit 401 to acquire the ink information and the paper information. The work memory 407 including a RAM is used to temporarily store and buffer image data when performing each service. The display unit 408 including LEDs or an LCD displays screens based on various types of data. The operation unit 409 includes switches used by the user to perform various input operations. The network communication unit 410 is connected with a network such as the Internet to perform various types of communications via the network connection unit 411. The network communication unit 410 performs communication via a wired LAN or wireless LAN. In a case where the network communication unit 410 supports a wired LAN, the network connection unit 411 is a connector for connecting a wired LAN cable. In a case where the network communication unit 410 supports a wireless LAN, the network connection unit 411 is an antenna. The network connection unit 411 may support both a wired LAN and a wireless LAN. According to the present embodiment, the network communication unit 410 supports a wireless LAN and connects with the AP 106 in accordance with a wireless communication method of a wireless LAN conforming to the IEEE802.11 standard series.

The flash memory 412 is a nonvolatile memory for storing image data received by the network communication unit 410. The above-described units are connected with each other via a bus 413. Processing of the printing apparatus 104 (described below) is implemented when the CPU 405 reads and executes a program required for processing.

<Print Processing Using Audio Control Device 101>

In the system illustrated in FIG. 1, print processing using the audio control device 101 is performed. To perform print processing using the audio control device 101, it is necessary to perform registration processing for enabling the management server 102 to manage the apparatuses in association with each other. The registration processing will be described below with reference to the sequence diagram illustrated in FIG. 6. In this sequence, processing performed by each apparatus is implemented when the CPU of the apparatus executes a program stored in the ROM of the apparatus. The program executed by the terminal device 105 is an audio control application.

The registration processing for enabling the management server 102 to manage the apparatuses in association with each other will be described below.

Before the registration processing is performed, the user logs in to the user account for the audio control device 101 managed by the management server 102 (hereinafter referred to as a first account), by using the audio control application of the terminal device 105. Thus, the management server 102 manages the terminal device 105 and the first account in association with each other. As a result, the management server 102 recognizes information about the audio control application of the terminal device 105 associated with the first account. The terminal device 105 recognizes information about the first account, including the account name, identifier (ID), and password.

In step S601, upon reception of a predetermined operation from the user, the audio control device 101 enters a mode for performing the registration processing. More specifically, the audio control device 101 enables its own access point.

In step S602, the terminal device 105 receives a registration processing execution instruction from the user as an input to a screen displayed by the audio control application.

In step S603, the terminal device 105 connects with the access point of the audio control device 101 via Wi-Fi.

In step S604, the terminal device 105 identifies an external access point which the audio control device 101 is to be connected with. More specifically, the terminal device 105 searches for surrounding external access points and displays a list of external access points found. Then, the terminal device 105 identifies the external access point selected from the list by the user. The method for identifying an external access point is not limited thereto. For example, the terminal device 105 may receive a list of external access points found in a search performed by the audio control device 101, from the audio control device 101 via a Wi-Fi connection. Then, the terminal device 105 may identify the external access point selected from the list by the user. Alternatively, for example, the terminal device 105 may identify the external access point with which the terminal device 105 was connected when the terminal device 105 receives a registration processing execution instruction from the user.

In step S605, the terminal device 105 transmits information about the external access point identified in step S604 and the above-described information about the first account to the audio control device 101 via a Wi-Fi connection. After transmitting information in step S605, the terminal device 105 may disconnect the Wi-Fi connection with the audio control device 101 and establish a Wi-Fi connection with the external access point identified in step S604.

In the above descriptions, the audio control device 101 receives information required for first registration processing via Wi-Fi, but the present invention is not limited to this configuration. For example, in a mode for performing the first registration processing, the audio control device 101 may enable the Bluetooth function and receive information required for the first registration processing via the Bluetooth connection with the terminal device 105.

In step S606, the audio control device 101 disables its own access point to disconnect the Wi-Fi connection with the terminal device 105. Then, the audio control device 101 connects with the target external access point via Wi-Fi based on the external access point information received from the terminal device 105. When a Wi-Fi connection with an external access point is successful, the audio control device 101 may audibly notify the user of the connection.

In step S607, the audio control device 101 accesses the management server 102 via an external access point and transmits the information about the first account received from the terminal device 105 and its own identification information to the management server 102.

In step S608, based on the received information, the management server 102 manages the audio control device 101 and the first account in association with each other. At this point, the management server 102 already manages the terminal device 105 and the first account in association with each other. In this way, the audio control device 101, the terminal device 105, and the first account are managed in association with each other in step S608.

In step S609, the terminal device 105 registers services (skills) to be used by using the audio control device 101. According to the present embodiment, since a printing service using the audio control device 101 is used, a printing service applicable to the printing apparatus 104 is to be registered. Therefore, the terminal device 105 transmits information indicating that the printing service applicable to the printing apparatus 104 was selected by the user, to the management server 102.

In step S610, based on the received information, the management server 102 manages the printing service applicable to the printing apparatus 104 and the first account in association with each other. More specifically, the printing service applicable to the printing apparatus 104 is registered.

In step S611, the terminal device 105 displays a login screen for enabling the user to log in to the user account (hereinafter referred to as a second account) managed by the relay server 103 associated with the printing service. The terminal device 105 acquires information for displaying the login screen, for example, by accessing the relay server 103 associated with the printing service. Since the user has logged in to the second account via a PC which controls the printing apparatus 104, the relay server 103 is assumed to be managing the second account and printing apparatus 104 in association with each other in advance.

In step S612, the terminal device 105 transmits the login information (including ID and password) input to the login screen, the information about the first account, and the information about the management server 102 to the relay server 103.

In step S613, the relay server 103 determines whether the received login information is correct. If the received login information is correct and login to the second account is successful, the relay server 103 accesses the management server 102 based on the received information about the management server 102. Then, the relay server 103 transmits an access token for permitting an access with the first account and the information about the second account to the management server 102.

In step S614, based on the received information, the management server 102 manages the first and the second accounts in association with each other.

This enables the management server 102 to manage each account and each apparatus in association with each other, making it possible to recognize which information is to be transmitted to which apparatus in notification processing according to the present embodiment.

The above-described processing performed by the terminal device 105 may be performed not via the audio control application but, for example, via a web browser on the terminal device 105.

Figure 6:
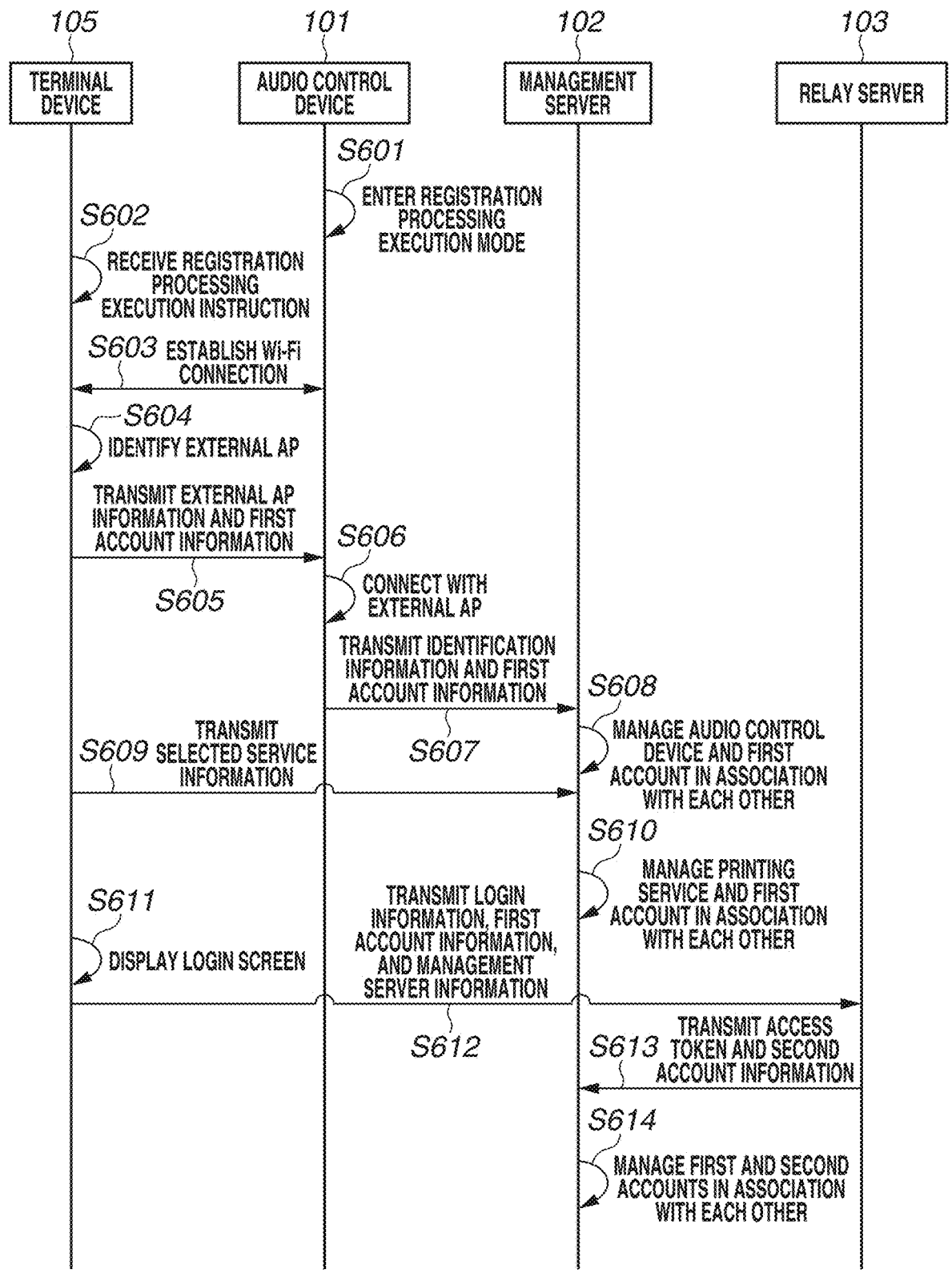
FIG. 6 is a sequence diagram illustrating registration processing performed by the management server to manage apparatuses in association with each other.
Figure 7:
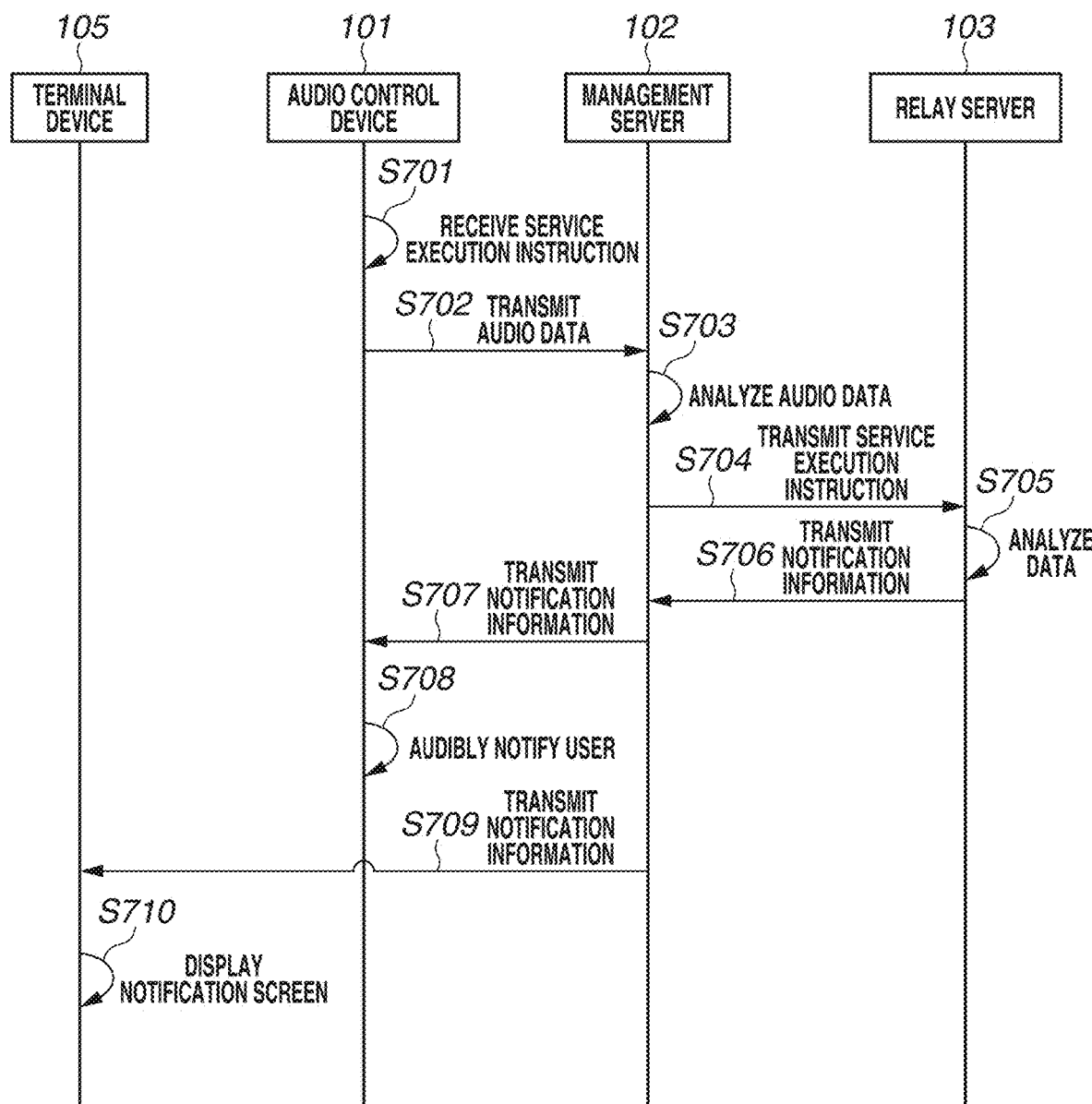
FIG. 7 is a sequence diagram illustrating printing service execution processing.

Printing service execution processing for using the printing service via the audio control device 101 will be described below. FIG. 7 is a sequence diagram illustrating the printing service execution processing. Processing performed by each apparatus in this sequence is implemented when the CPU of the apparatus executes a program stored in the ROM of the apparatus. Processing performed by each apparatus in this sequence is assumed to be performed in a state where the registration processing described with reference to FIG. 6 is completed.

First of all, the user utters a first wake word corresponding to the audio control device 101 in the vicinity of the audio control device 101. Then, the audio control device 101 enters a mode for receiving a speech instruction from the user. Then, the user utters a second wake word as a printing service execution instruction for executing the registered printing service.

In step S701, the audio control device 101 receives the user's voice through the microphone 204 to receive a printing service execution instruction (second wake word).

In step S702, the audio control device 101 transmits audio data based on the speech instruction received in step S701, to the management server 102 via the Internet. When transmitting audio data, the audio control device 101 may transmit the user's voice received through the microphone 204 as it is as audio data, or convert the user's voice into text data and transmit the text data as audio data.

In step S703, the management server 102 analyzes the received audio data. More specifically, the management server 102 analyzes audio data corresponding to the second wake word to identify a registered printing service, the relay server 103 associated with the registered printing service, and the second account associated with the printing service.

In step S704, the management server 102 notifies the relay server 103 associated with the printing service of the reception of the printing service execution instruction. Information transmitted at this time includes information indicating the second account associated with the registered printing service.

In step S705, the relay server 103 identifies a request for execution of the printing service. The relay server 103 identifies the second account associated with the registered printing service and identifies which printing apparatus 104 is to be used to execute the printing service.

In step S706, the relay server 103 transmits notification information to the management server 102 to notify the management server 102 of functions executable with the printing apparatus 104 in the printing service. According to the present embodiment, since notification is to be made by both the audio control device 101 and the terminal device 105, the relay server 103 transmits notification information for the audio control device 101 and notification information for the terminal device 105. According to the present embodiment, the contents of a message to be audibly notified to the user by the audio control device 101 are determined by the notification information for the audio control device 101. More specifically, the relay server 103 controls the contents of a message to be audibly notified to the user by the audio control device 101. Likewise, the contents of a message and a graphic to be notified to the user through a screen by the terminal device 105 are determined by notification information for the terminal device 105. More specifically, the relay server 103 controls the contents of a message and a graphic to be notified to the user through a screen by the terminal device 105.

In step S707, based on the received notification information, the management server 102 transmits audio notification information for audibly notifying the user of functions executable with the printing apparatus 104 in the printing service, to the audio control device 101.

In step S708, based on the received audio notification information, the audio control device 101 audibly notifies the user of functions executable with the printing apparatus 104 in the printing service, through the speaker 201. According to the present embodiment, functions executable with the printing apparatus 104 in the printing service include the print function of causing the printing apparatus 104 to perform printing, and a status confirmation function of conforming the status of the printing apparatus 104. Thus, the audio control device 101 audibly notifies the user that the print function and the status confirmation function are available.

In step S709, based on the received notification information, the management server 102 transmits screen notification information for notifying, through screen display, the user of functions executable with the printing apparatus 104 in the printing service, to the terminal device 105 associated with the first account. Step S709 may be executed before step S707.

In step S710, based on the received screen notification information, the terminal device 105 displays on the display unit 504 a notification screen for notifying the user of functions executable with the printing apparatus 104 in the printing service. More specifically, the terminal device 105 displays a notification screen 1300 as illustrated in FIG. 13A. According to the present embodiment, the terminal device 105 notifies, through a notification screen, the user of more detailed contents than the contents audibly notified to the user by the audio control device 101. The notification screen 1300 includes an area 1301 for notifying the user of functions executable with the printing apparatus 104 in the printing service, and an area 1302 for notifying the user of contents printable by the print function. According to the present embodiment, the message included in the area 1301 is also audibly notified to the user in step S708. However, the message included in the area 1302 is not audibly notified to the user in step S708 but notified to the user only through screen notification in step S710. The notification screen 1300 may include not only messages for notifying the user of information about the printing apparatus 104 like the messages displayed in the areas 1301 and 1302 but also graphics for notifying the user of information about the printing apparatus 104.

This enables the user to grasp functions executable with the printing apparatus 104 in the printing service and start using the printing service.

Figure 8:
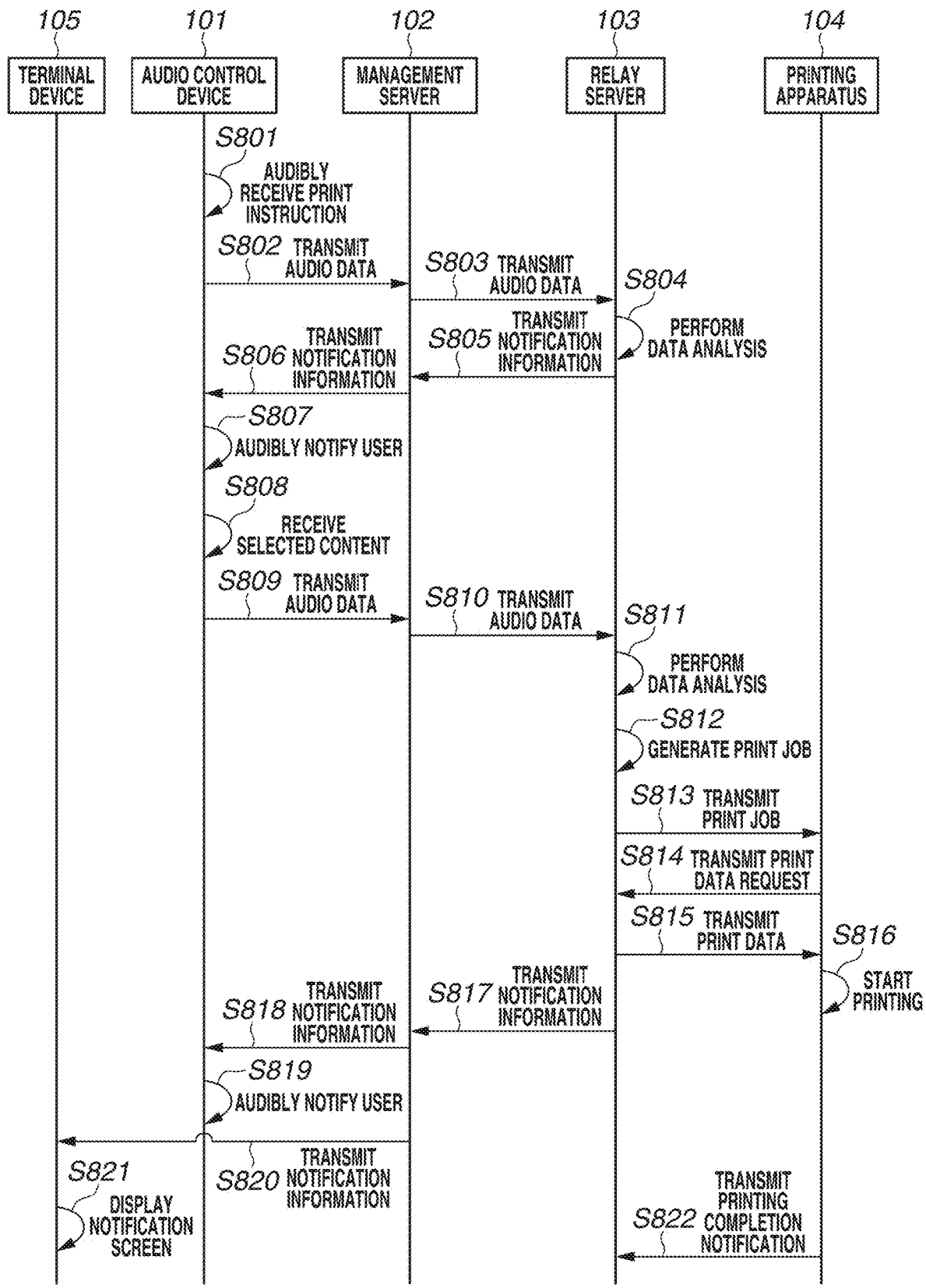
FIG. 8 is a sequence diagram illustrating print processing using the audio control device.

Print processing using the audio control device 101 will be described below. FIG. 8 is a sequence diagram illustrating the print processing using the audio control device 101. Processing performed by each apparatus in this sequence is implemented when the CPU of the apparatus executes a program stored in the ROM of the apparatus. Processing performed by each apparatus in this sequence is assumed to be performed in a state where the printing service execution processing described above with reference to FIG. 7 is completed and where the user is aware of functions executable with the printing apparatus 104 in the printing service.

To use the print function from among functions executable with the printing apparatus 104 in printing service, the user utters a third wake word corresponding to the print function as a print instruction.

In step S801, the audio control device 101 receives the user's voice through the microphone 204 to receive a print instruction (third wake word).

In step S802, the audio control device 101 transmits audio data based on the speech instruction received in step S801, to the management server 102 via the Internet. As in step S702, the audio control device may convert the user's voice into text data and transmit the text data as audio data.

In step S803, the management server 102 transmits information based on the received audio data to the relay server 103.

In step S804, the relay server 103 analyzes the information received in step S803 to identify a request for execution of the print function.

In step S805, the relay server 103 transmits notification information for the audio control device 101 for audibly notifying the user of the types of contents printable by the print function, to the management server 102. In the present embodiment, the types of contents printable by the print function are only audibly notified to the user by the audio control device 101, but the types of contents may be notified to the user through screen notification by the terminal device 105. More specifically, the relay server 103 may further transmit notification information for the terminal device 105 for notifying, through screen display, the user of the types of contents printable by the print function.

In step S806, based on the received notification information, the management server 102 transmits audio notification information for audibly notifying the user of the types of contents printable by the print function, to the audio control device 101.

In step S807, based on the received audio notification information, the audio control device 101 audibly notifies the user of the types of contents printable by the print function, through the speaker 201.

When the user learns the types of contents printable by the print function, the user utters the name of the target content to select a content to be printed by the print function. At this time, the user may also utter print settings (number of copies to be printed, printing color settings, etc.) for printing of the content.

Then, in step S808, the audio control device 101 receives the user's voice through the microphone 204 to receive a selected content to be printed by the print function and print settings.

In step S809, the audio control device 101 transmits audio data based on the speech instruction received in step S808, to the management server 102 via the Internet.

In step S810, the management server 102 transmits information based on the received audio data to the relay server 103.

In step S811, the relay server 103 analyzes the information received in step S810 to identify the content to be printed by the print function.

In step S812, the relay server 103 generates binary format print data for printing the printing target content and a print job for instructing the printing apparatus 104 associated with the second account to print the printing target content. The generated print data is stored in a predetermined storage area of the relay server 103. The generated print job includes information for acquiring the print data stored in the predetermined storage area of the relay server 103, such as the Uniform Resource Locator (URL).

In step S813, the relay server 103 transmits, via the Internet, the generated print job to the printing apparatus 104 associated with the second account.

In step S814, based on the received print job, the printing apparatus 104 transmits a request for acquiring the print data stored in the predetermined storage area of the relay server 103, to the relay server 103.

In step S815, in response to the request received in step S814, the relay server 103 transmits the print data generated in step S812 to the printing apparatus 104. Instead of separately transmitting a print job and print data to the printing apparatus 104, the relay server 103 may transmit a print job including the print data in step S813.

In step S816, the printing apparatus 104 starts printing based on the print job and print data received. If an error occurs during printing, the printing apparatus 104 transmits status information indicating that the printing apparatus 104 is in an error state to the relay server 103.

When the printing apparatus 104 starts printing in step S816, then in step S817, the relay server 103 transmits notification information for notifying the user that the selected content is currently being printed by the printing apparatus 104, to the management server 102. According to the present embodiment, since notification is to be made by both the audio control device 101 and the terminal device 105, the relay server 103 transmits notification information for the audio control device 101 and notification information for the terminal device 105.

In step S818, based on the received notification information, the management server 102 transmits audio notification information for audibly notifying the user that the selected content is currently being printed by the printing apparatus 104, to the audio control device 101.

In step S819, based on the received audio notification information, the audio control device 101 audibly notifies the user that the selected content is currently being printed by the printing apparatus 104, through the speaker 201.

In step S820, based on the received notification information, the management server 102 transmits screen notification information for notifying, through screen display, the user that the selected content is currently being printed by the printing apparatus 104, to the terminal device 105 associated with the first account. Step S820 may be executed before step S818.

In step S821, based on the received screen notification information, the terminal device 105 displays on the display unit 504 a notification screen for notifying the user that the selected content is currently being printed by the printing apparatus 104. More specifically, the terminal device 105 displays a notification screen 1303 as illustrated in FIG. 13B. According to the present embodiment, the terminal device 105 notifies, through a notification screen, the user of more detailed contents than the contents audibly notified to the user by the audio control device 101. The notification screen 1303 includes an area 1304 for notifying the user that the selected content is currently being printed by the printing apparatus 104, and an area 1305 for notifying the user of a wake word for executing a print instruction, different from the third wake word. According to the present embodiment, the message included in the area 1304 is also audibly notified to the user in step S819. However, the message included in the area 1305 is not audibly notified to the user in step S819 but notified to the user only through screen notification in step S821.

When printing based on a print job is completed, then in step S822, the printing apparatus 104 transmits printing completion status information indicating the completion of printing to the relay server 103.

Thus, upon issuance of a speech instruction for printing to the audio control device 101 as a trigger, the printing apparatus 104 can start printing.

After step S822, based on the printing completion status information, the relay server 103 may transmit notification information for notifying the user of the completion of printing to the audio control device 101 and the terminal device 105.

Figure 9:
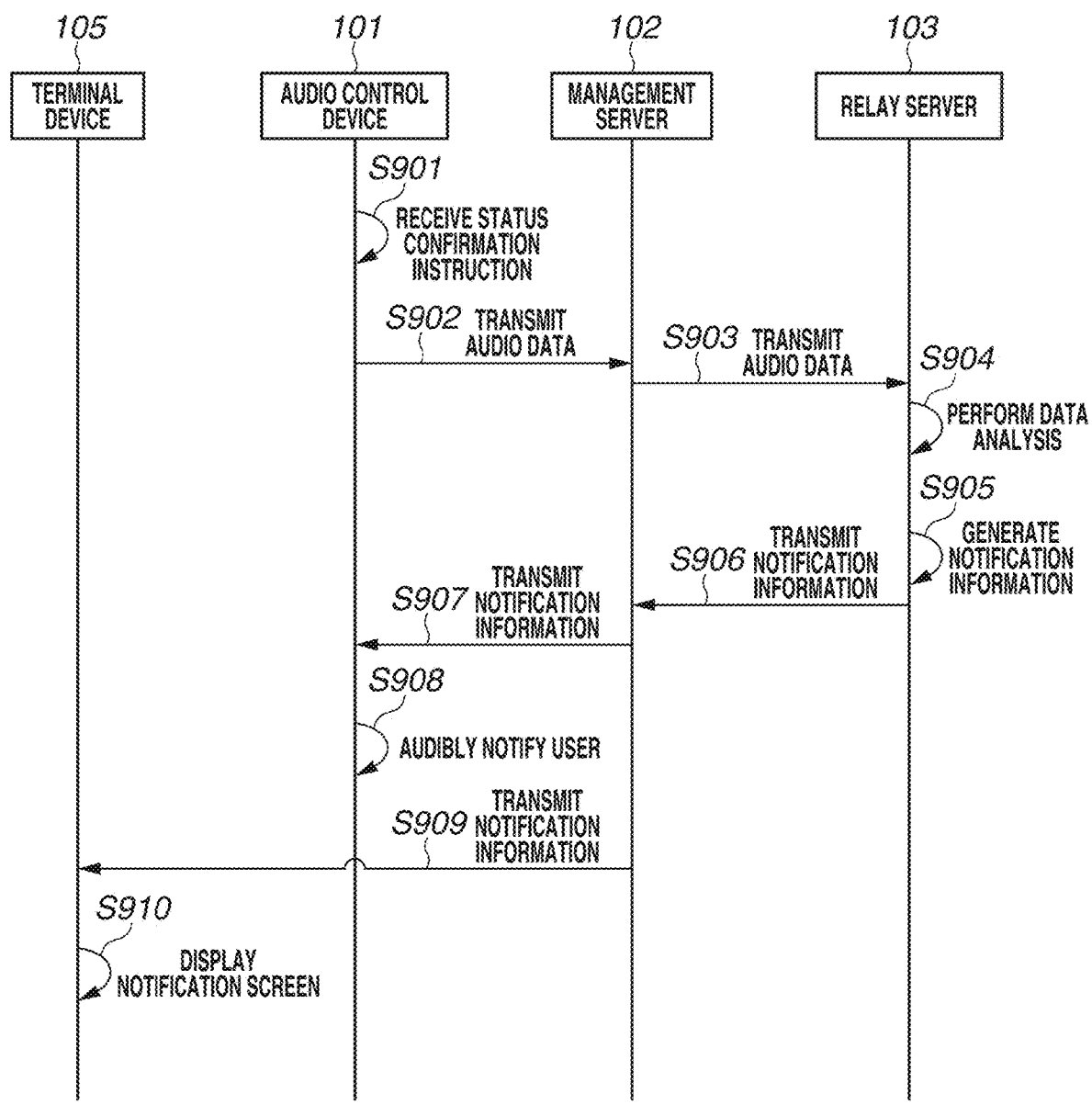
FIG. 9 is a sequence diagram illustrating status confirmation processing for confirming status information for a printing apparatus associated with the audio control device.

Status confirmation processing for confirming the status information of the printing apparatus 104 associated with the audio control device 101 will now be described. FIG. 9 is a sequence diagram illustrating the status confirmation processing. Processing performed by each apparatus in this sequence is implemented when the CPU of the apparatus executes a program stored in the ROM of the apparatus. The program executed by the terminal device 105 is an audio control application. Processing performed by each apparatus in this sequence is assumed be performed in a state where the printing service execution processing described above with reference to FIG. 7 is completed and where the user is aware of functions executable with the printing apparatus 104 in the printing service.

To use the status confirmation function from among functions executable with the printing apparatus 104 in the printing service, the user utters a fourth wake word corresponding to the status confirmation function as an instruction for confirming the status of the printing apparatus 104 (an instruction for acquiring the status information of the printing apparatus 104).

Then, in step S901, the audio control device 101 receives the user's voice through the microphone 204 to receive an instruction for confirming the status of the printing apparatus 104 (fourth wake word).

In step S902, the audio control device 101 transmits audio data based on the speech instruction received in step S901, to the management server 102 via the Internet. As in step S702, the audio control device may convert the user's voice into text data and transmit the text data as audio data.

In step S903, the management server 102 transmits information based on the received audio data to the relay server 103.

In step S904, the relay server 103 analyzes the information received in step S803 to identify a request for execution of the status confirmation function.

According to the present embodiment, each time the status of the printing apparatus 104 or the status of ink provided in the printing apparatus 104 changes, the printing apparatus 104 transmits information about the status (status information) to the relay server 103. According to the present embodiment, the status information includes error information indicating that the printing apparatus 104 is in an error state, and ink information (recording agent information) indicating the status of ink provided in the printing apparatus 104.

For example, each time the status of the printing apparatus 104 changes from the normal state (no error occurrence) to an error state, the printing apparatus 104 transmits the status information indicating that the printing apparatus 104 is in an error state to the relay server 103. For example, each time the status of the printing apparatus 104 changes from an error state to the normal state, the printing apparatus 104 transmits the status information indicating that the printing apparatus 104 is in the normal state to the relay server 103.

For example, each time the status of ink provided in the printing apparatus 104 changes from the normal state (remaining amount of ink is sufficient) to the small-ink-amount state (remaining amount of ink is small), the printing apparatus 104 transmits the status information indicating the status of ink provided in the printing apparatus 104 to the relay server 103.

Then, each time the relay server 103 receives the status information, the relay server 103 updates the currently retained status information and identifies the latest status of the printing apparatus 104 associated with the second account.

In step S905, the relay server 103 generates notification information based on the currently retained status information. According to the present embodiment, since notification is made by both the audio control device 101 and the terminal device 105, the relay server 103 generates notification information for the audio control device 101 and notification information for the terminal device 105.

Upon reception of a request for status confirmation, the relay server 103 may request the printing apparatus 104 for the latest status information and acquire new status information. In this case, notification information is generated based on the new status information acquired.

According to the present embodiment, when the relay server 103 identifies that a plurality of errors is occurring in the printing apparatus 104 based on the status information, notification information to be generated differs according to the priority set for each error. A specific method for generating notification information will be described below.

In step S906, the relay server 103 transmits the generated notification information to the management server 102.

In step S907, based on the received notification information, the management server 102 transmits audio notification information for audibly notifying the user of the status of the printing apparatus 104 to the audio control device 101.

In step S908, based on the received audio notification information, the audio control device 101 audibly notifies the user of the status of the printing apparatus 104 through the speaker 201. A specific notification method will be described below.

In step S909, based on the received notification information, the management server 102 transmits screen notification information for notifying, through screen display, the user of the status of the printing apparatus 104, to the terminal device 105 associated with the first account. Step S909 may be executed before step S907.

In step S910, based on the received screen notification information, the terminal device 105 displays a notification screen for notifying the user of the status of the printing apparatus 104 on the display unit 504. A specific notification method will be described below.

Thus, upon issuance of a speech instruction to the audio control device 101 as a trigger, the user can confirm the status of the printing apparatus 104.

Figure 10:
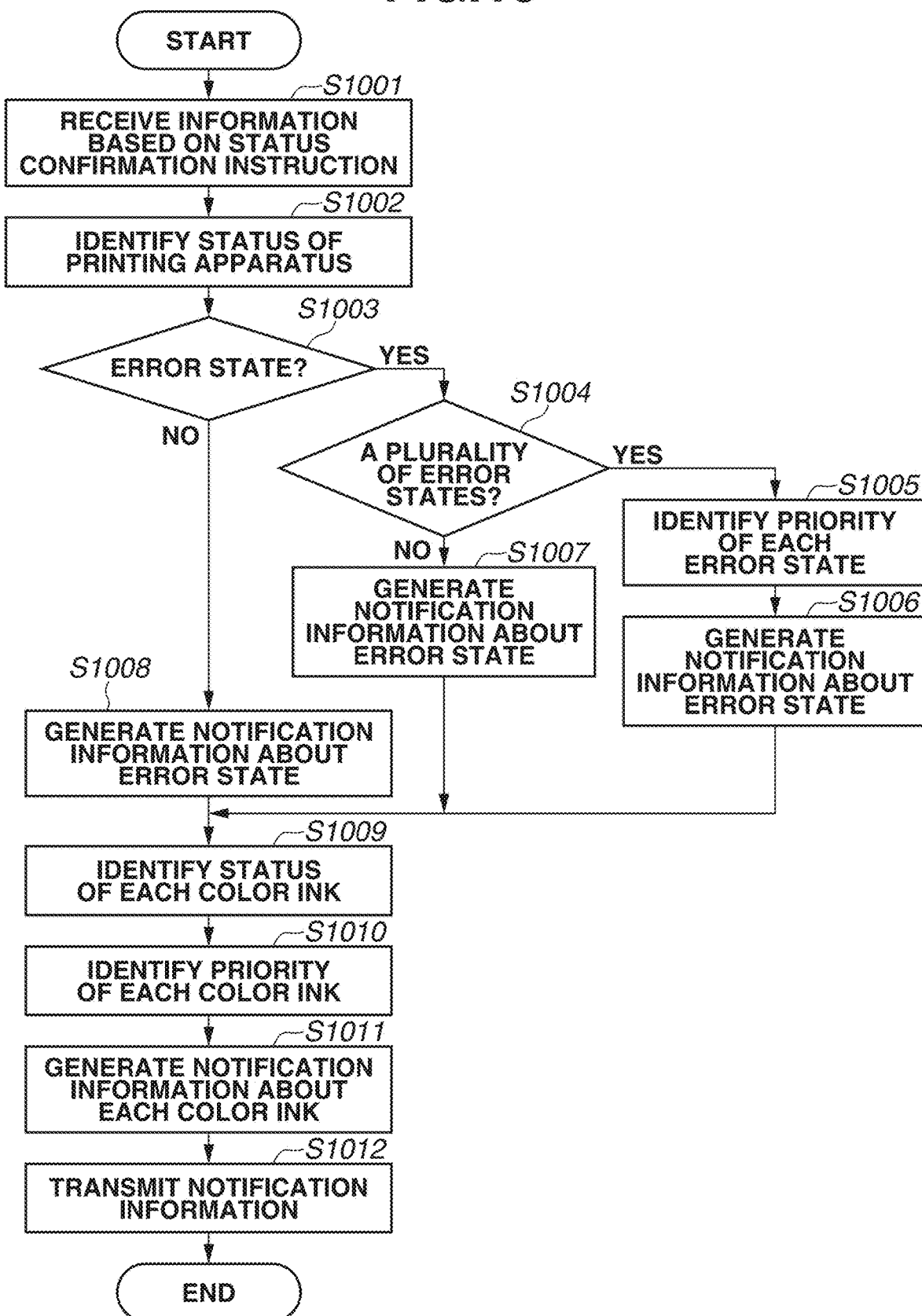
FIG. 10 is a flowchart illustrating processing performed by the relay server in the status confirmation processing.

FIG. 10 is a flowchart illustrating processing performed by the relay server 103 in the status confirmation processing. The processing illustrated in this flowchart is implemented when the CPU 301 of the relay server 103 executes a program stored in the disk apparatus 302 of the relay server 103.

In step S1001, the CPU 301 receives from the management server 102 information transmitted based on a speech instruction for status confirmation to the audio control device 101.

In step S1002, the CPU 301 analyzes the currently retained status information of the printing apparatus 104 to identify the status of the printing apparatus 104. The status of the printing apparatus 104 includes an error state (an error occurrence), the normal state (no error occurrence), and a state where printing is currently being performed based on a print job. According to the present embodiment, an error state refers to a state where the printing apparatus 104 is unable to perform printing. Error states include a cover open state, paper jam state, out-of-paper state, busy state, and offline state. The cover open state refers to a state where a cover (not illustrated) is opened when an ink cartridge is attached to the printing head included in the printing apparatus 104. The paper jam state refers to a state where paper (recording medium) jams in the conveyance path. The out-of-paper state refers to a state where the printing apparatus 104 holds no paper. The busy state refers to a state where the printing apparatus 104 is performing non-print processing (for example, scan processing for reading a document and generating image data). The offline state refers to a state where power is not supplied to the printer unit 401 (or power supply is restricted). Error states may include a small-ink-amount state where the printing apparatus 104 holds a small amount of remaining ink (recording agent), an out-of-ink state where the printing apparatus 104 holds no ink, and a small-paper-amount state where the printing apparatus 104 holds a small amount of paper. If a plurality of errors occurs in the printing apparatus 104, a plurality of error states is identified in step S1004.

In step S1003, the CPU 301 determines whether the status of the printing apparatus 104 identified in step S1002 is an error state. When the CPU 301 determines that the status of the printing apparatus 104 is an error state (YES in step S1003), the processing proceeds to step S1004. On the other hand, when the CPU 301 does not determine that the status of the printing apparatus 104 is an error state (NO in step S1003), the processing proceeds to step S1008.

In step S1004, the CPU 301 determines whether a plurality of errors occurs in the printing apparatus 104 (whether a plurality of error states was identified in step S1002). When the CPU 301 determines that a plurality of errors occurs in the printing apparatus 104 (YES in step S1004), the processing proceeds to step S1005. On the other hand, when the CPU 301 does not determine that a plurality of errors occurs in the printing apparatus 104 (NO in step S1004), the processing proceeds to step S1007.

In step S1005, the CPU 301 identifies the priority of each of the plurality of error states identified in step S1002. More specifically, the CPU 301 first refers to a priority table as illustrated in FIG. 11. The priority table is stored in the database 313. The priority table defines the priority of each error state. The CPU 301 identifies the priorities of the plurality of error states identified in step S1002 based on the priorities defined in the priority table. According to the present embodiment, the cover open state, paper-jam state, out-of-paper state, busy state, and offline state are assigned priorities decreasing in this order. For example, if the plurality of error states includes the cover open state, out-of-paper state, and offline state, the priority of the cover open state is the highest, the priority of the out-of-ink state the second highest, and the priority of the offline state is the lowest. The contents of priorities and error states defined in the priority table may not be limited to the above-described configuration, and may be arbitrarily defined.

In step S1006, based on the status of the printing apparatus 104 identified in step S1002 and the priority of each error state identified in step S1005, the CPU 301 generates notification information about the error state of the printing apparatus 104. More specifically, the CPU 301 generates notification information so that an error state assigned a higher priority may be more preferentially notified to the user by the audio control device 101 and the terminal device 105. More specifically, the CPU 301 generates notification information so that only the error state assigned the highest priority, among the plurality of error states identified in step S1002, is notified to the user and error states other than the error state assigned the highest priority are not notified to the user. As described above, according to the present embodiment, notification is made by both the audio control device 101 and the terminal device 105 based on the notification information. Thus, the CPU 301 generates notification information for the audio control device 101 for audibly notifying the user of the status of the printing apparatus 104, and notification information for the terminal device 105 for notifying the user of the status of the printing apparatus 104 through screen display. As illustrated in the table illustrated in FIG. 11, for each error state notified, a message for notifying the user of the error state is defined. The notification information for the audio control device 101 is notification information used by the audio control device 101 to utter the target message. The notification information for the terminal device 105 is notification information used by the printing apparatus 104 to display a notification screen including the target message. The target message may include not only a message for notifying the user of an error state of the printing apparatus 104 but also a message for resolving the error state of the printing apparatus 104. For example, a message uttered by the audio control device 101 may differ from a message displayed by the terminal device 105; in particular, the message displayed by the terminal device 105 may include a message for resolving the error state of the printing apparatus 104 that is not included in the message uttered by the audio control device 101. Then, the processing proceeds to step S1009.

The present invention is not limited to this configuration. All of the error states identified in step S1002 may be notified to the user as long as an error state assigned a higher priority is more preferentially notified to the user by the audio control device 101 and the terminal device 105. More specifically, for example, notification information may be generated so that an error state assigned a higher priority may be audibly notified to the user before an error state assigned a lower priority, or a screen indicating an error state assigned a higher priority is displayed before a screen indicating an error state assigned a lower priority.

In step S1007 which is executed when the CPU 301 does not determine that a plurality of errors occurs in the printing apparatus 104 (NO in step S1004), the CPU 301 generates notification information about the error state of the printing apparatus 104 based on the status of the printing apparatus 104 identified in step S1002. Since only one error occurred in the printing apparatus 104, both notification information for the audio control device 101 and notification information for the terminal device 105 are generated so that the error state related to the one error is notified to the user. Then, the processing proceeds to step S1009.

In step S1008 which is executed when the CPU 301 does not determine that the status of the printing apparatus 104 is an error state (NO in step S1003), the CPU 301 generates notification information about the error state of the printing apparatus 104 based on the status of the printing apparatus 104 identified in step S1002. Since no error occurred in the printing apparatus 104, both notification information for the audio control device 101 and notification information for the terminal device 105 are generated so that a non-error state (normal state) of the printing apparatus 104 is notified to the user. Then, the processing proceeds to step S1009.

According to the present embodiment, when the printing apparatus 104 is in an error state, the error state of the printing apparatus 104 is audibly notified to the user and then information about ink provided in the printing apparatus 104 is audibly notified to the user. According to the present embodiment, the printing apparatus 104 is assumed to be provided with ink of four colors: black, cyan, magenta, and yellow. Therefore, information about ink provided in the printing apparatus 104 is notified to the user for each color.

In step S1009, the CPU 301 identifies the status of ink (ink status) for each color included in the printing apparatus 104. Ink states include the out-of-ink state, small-ink-amount state 1, small-ink-amount state 2, and normal state. The out-of-ink state refers to a state where the amount of ink is smaller than a first amount. The small-ink-amount state 1 refers to a state where the amount of ink is larger than the first amount and smaller than a second amount. The small-ink-amount state 2 refers to a state where the amount of ink is larger than the second amount and smaller than a third amount. The normal state refers to a state where the amount of ink is larger than the third amount. Therefore, the normal state, small-ink-amount state 2, small-ink-amount state 1, and out-of-ink state indicate amounts of ink provided in the printing apparatus 104 decreasing in this order. The out-of-ink state, small-ink-amount state 1, and small-ink-amount state 2 can also be regarded as error states related to ink of the printing apparatus 104.

In step S1010, the CPU 301 identifies the priority of each color ink. More specifically, the CPU 301 first refers to the priority table as illustrated in FIG. 12. The priority table is stored in the database 313. The priority table defines the priorities of ink states. The CPU 301 identifies the priority of each color ink based on the priorities defined in the priority table. According to the present embodiment, the out-of-ink state, small-ink-amount state 1, small-ink-amount state 2, and normal state are assigned higher priorities in this order. For example, in a case where the black ink is in the out-of-ink state, the cyan and magenta ink is in the small-ink-amount state 1, and the yellow ink is in the normal state, the black ink is assigned the highest priority, the cyan and magenta ink are assigned the second highest priority, and the yellow ink is assigned the lowest priority. The priorities and error states defined in the priority table are not limited to the above-described configuration and may be arbitrarily defined. In a case where ink of colors other than black, cyan, magenta, and yellow is held by the printing apparatus 104, priorities are also identified for the ink of colors other than black, cyan, magenta, and yellow.

In step S1011, based on the ink state of each color ink and the priorities identified in step S1007, the CPU 301 generates notification information about each color ink provided in the printing apparatus 104. More specifically, the CPU 301 generates notification information so that the ink state of an ink color assigned a higher priority is more preferentially notified to the user by the audio control device 101 and the terminal device 105. More specifically, the CPU 301 generates notification information so that the ink state of an ink color assigned a higher priority is audibly notified before the ink state of an ink color assigned a lower priority. The CPU 301 generates notification information so that the ink state of an ink color assigned a higher priority is displayed at a higher position in the notification screen than the ink state of an ink color assigned a lower priority. The CPU 301 may generate notification information so that only the ink state of the ink color assigned the highest priority is notified to the user, and the ink states of ink colors other than the ink color assigned the highest priority are not notified to the user. In a case where there exists a plurality of inks of colors assigned the highest priority, the CPU 301 generates notification information so that the ink states of the ink colors assigned the highest priority are more preferentially notified to the user over ink states of ink colors other than the ink colors assigned the highest priority. Both notification information for the audio control device 101 and notification information for the terminal device 105 are also generated as notification information about each color ink. As illustrated in the table illustrated in FIG. 11, for each ink state notified, a message for notifying the user of the ink state is defined. The notification information for the audio control device 101 is notification information used by the audio control device 101 to utter the target message and ink color. The notification information for the terminal device 105 is notification information used by the printing apparatus 104 to display a notification screen including the target message and ink color. The target message may include not only a message for notifying the user of the ink status of the printing apparatus 104 but also a massage for notifying the user of identification information such as the part number of ink. For example, a message uttered by the audio control device 101 may differ from a message displayed by the terminal device 105. In the present embodiment, a message for notifying the part number of ink is not included in a message uttered by the audio control device 101 but included in a message displayed by the terminal device 105. This is because, in many cases, information about the part number of ink includes an enumeration of alphanumeric characters, making it difficult for the user to correctly grasp the part number of ink audibly notified.

The present invention is not limited to this configuration. Notification information may be generated so that only the ink state of an ink color assigned a higher priority is notified to the user and the ink state of an ink color assigned a lower priority is not notified to the user.

According to the present embodiment, when the ink states of all the ink colors are the normal state, the CPU 301 generates notification information indicating that the ink states of all the ink colors are the normal state. When the ink state of ink of any one color is not the normal state, the CPU 301 generates notification information so that the ink states of ink colors in the normal state are not notified to the user. However, the present invention is not limited to this configuration. Even when the ink state of ink of any one color is not the normal state, the CPU 301 may generate notification information so that the ink states of ink colors in the normal state are notified to the user.

In step S1012, the CPU 301 transmits notification information about the error state of the printing apparatus 104 and notification information about each color ink generated to the management server 102.

Upon reception of the notification information, the management server 102 transmits the notification information for the audio control device 101 to the audio control device 101 associated with the first account. Then, the audio control device 101 audibly notifies the user of the status information based on the received notification information. More specifically, the audio control device 101 audibly notifies the user of the status information based on notification information about the error state of the printing apparatus 104 and then audibly notifies the user of the status information based on notification information about each color ink. For example, in a case where notification information includes notification information for notifying the user that the printing apparatus 104 is in the cover open state and notification information for notifying the user of the ink states of the yellow and magenta ink, for example, the audio control device 101 utters a message "Printer cover is open. Close the cover. The following ink ran out: Magenta. The amount of the following ink is small: Yellow". For example, in a case where notification information includes notification information for notifying the user that the printing apparatus 104 is in the normal state and notification information for notifying the user that the ink states of all the ink colors are the normal state, for example, the audio control device 101 utters a message "Printer is in the normal state. The amount of ink is sufficient for all the ink colors".

Upon reception of notification information, the management server 102 transmits notification information for the terminal device 105 to the terminal device 105 associated with the first account. Then, the terminal device 105 displays a notification screen based on the received notification information on the display unit 504. According to the present embodiment, the terminal device 105 notifies, through a notification screen, the user of more detailed content than the content audibly notified by the audio control device 101.

FIG. 13C illustrates an example of a notification screen displayed on the display unit 504 when the notification information includes notification information for notifying the user that the printing apparatus 104 is in the cover open state and notification information for notifying the user of the ink states of the yellow and magenta ink. A notification screen 1306 includes an area 1307 for notifying the user of the error states of the printing apparatus 104, and an area 1308 for notifying the user of the ink state of ink provided in the printing apparatus 104. According to one embodiment, the message included in the area 1307 is also audibly notified to the user by the audio control device 101. The area 1307 may include an error of lower priority that is not audibly notified to the user by the audio control device 101. In that case, the area 1307 includes a message not audibly notified to the user by the audio control device 101 but notified to the user only through screen notification by the terminal device 105. The notification screen may include not only messages for notifying the user of information about the printing apparatus 104 but also graphics for notifying the user of information about the printing apparatus 104.

According to the present embodiment, a message related to the printing apparatus 104 can be notified to the user in response to a speech instruction from the user to the audio control device 101.

According to the present embodiment, the audio control device 101 audibly notifies the user of a message related to the printing apparatus 104, and at the same time the terminal device 105 notifies the user of a message related to the printing apparatus 104 through a notification screen. An audio notification enables the user, for example, to grasp a message related to the printing apparatus 104 even while the user is performing other works. A notification through a notification screen enables the user to confirm the status of the printing apparatus 104 not only through audio notification but also through screen notification. More specifically, for example, a message related to the printing apparatus 104 can be notified to both a user in the vicinity of the audio control device 101 and a user apart from the audio control device 101. For example, a message related to the printing apparatus 104 can be notified to both a user who failed to hear an audio message uttered by the audio control device 101 and a user who wants to confirm a notification again after an audio message is uttered by the audio control device 101 if the user confirms a notification screen.

The user generally needs to be notified of more detailed information as much as possible. However, if there is a large amount of information to be audibly notified to the user, the user may fail to hear audio messages, possibly being unable to correctly recognize the information notified. However, the user is able to correctly recognize the information notified even if a large amount of information is notified to the user through screen display. According to the present embodiment, therefore, a message related to the printing apparatus 104 is audibly notified to the user and at the same time a message not audibly notified is notified to the user through a notification screen. Control according to the present embodiment reduces the amount of information to be audibly notified, enabling the user to correctly recognize the information. This control further enables the user to confirm detailed information through a notification screen. More specifically, the control enables the user to correctly recognize the information audibly notified and at the same time enables notifying the user of detailed information through a notification screen.

According to the present embodiment, if a plurality of errors occurs in the printing apparatus 104, not all of the plurality of errors are notified to the user through audio notification information but only errors assigned a high priority are audibly notified to the user. This enables audibly notifying the user of only important information and enables the user to correctly recognize the information audibly notified.

Other Embodiments

In the above-described embodiments, both the error states of the printing apparatus 104 and the ink states of the ink colors provided in the printing apparatus 104 are notified to the user according to a status confirmation instruction issued by the user, but the present invention is not limited to this configuration. For example, either the error states of the printing apparatus 104 or the ink states of the ink colors provided in the printing apparatus 104 may be notified to the user. For example, in a case where a word for confirming the error states of the printing apparatus 104 and a word for confirming the ink states of the ink colors provided in the printing apparatus 104 are distinguished from each other, from among the error states of the printing apparatus 104 and the ink states of the ink colors provided in the printing apparatus 104, a state corresponding to the word issued in a status confirmation instruction by the user may be notified to the user.

The above-described examples describe messages indicating identification information of ink of which the ink state is notified, as information (hereinafter referred to as specific information) not included in information audibly notified to the user by the audio control device 101 but included in information notified to the user through a notification screen displayed by the terminal device 105. However, the specific information is not limited thereto and may be, for example, information (a link to the target screen) for displaying a screen for prompting a user to purchase the ink of which the ink state is notified. For example, the specific information may be a message indicating details of the remaining amount of the ink of which the ink state is notified. For example, the specific information may be not only information about ink but also information about the error states of the printing apparatus 104. More specifically, the specific information may be a message and a graphic indicating a method for canceling the error state of the printing apparatus 104. In the above-described examples, information about the error and ink states assigned a low priority are not notified to the user, but the present invention is not limited to this configuration. For example, information about the error and ink states assigned a low priority are not audibly notified but notified through a notification screen, and information about the error and ink states assigned a low priority may be handled as the specific information.

In the above-described example, the printing apparatus 104 has a plurality of types of ink, but the present invention is not limited to this configuration. For example, if the printing apparatus 104 is a monochrome printer, the printing apparatus 104 may have only one type of ink (black ink). In this case, information about ink notified is information about only the black ink. For example, if the printing apparatus 104 is an electrophotographic printer, information about toner may be notified to the user instead of information about ink.

In the above-described examples, the audio control device 101 does not include a display unit, but the present invention is not limited to this configuration. The audio control device 101 may include a low-performance display unit or a small-size display unit, instead of a high-performance display unit or a large-size display unit, for presenting simple information to the user, the simple information being contents of a notification transmitted from the printing apparatus 104. If the audio control device 101 includes a high-performance display unit or a large-size display unit, the audio control device 101 may display a screen related to a notification transmitted from the printing apparatus 104 on the display unit provided on the audio control device 101.

In the above-described examples, the relay server 103 generates notification information for determining the contents to be audibly notified to the user by the audio control device 101 and notification information for determining the contents to be notified to the user through a screen by the terminal device 105, but the present invention is not limited to this configuration. For example, the notification information may be generated by the printing apparatus 104 and the management server 102 and then transmitted from the printing apparatus 104 and the management server 102.

The above-described embodiments are also implemented by performing the following processing. More specifically, software (program) for implementing the functions of the above-described embodiments is supplied to a system or apparatus via a network or various types of storage media, and a computer (CPU, micro processing unit (MPU), and processor) of the system or apparatus reads and executes the program. The program may be executed by either one computer or a plurality of computers in an associated way. Not all of the above-described processing need to be implemented by software. A part or whole of the processing may be implemented by hardware such as an Application Specific Integrated Circuit (ASIC). One CPU do not necessarily perform the entire processing, i.e., a plurality of CPUs may suitably perform processing in a cooperative way.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

What is claimed is:

1. A communication system including a printing apparatus for performing printing by applying a recording agent onto a recording medium via a printing unit, and a server system that communicates with the printing apparatus, the communication system comprising:
   a first transmission unit configured to transmit information for causing the printing apparatus to perform the printing;
   a printing unit configured to perform the printing based on information for causing the printing apparatus to perform the printing;
   a reception unit configured to receive predetermined information based on a predetermined speech instruction given to an audio control device;
   a second transmission unit configured to transmit, based on a reception of the predetermined information, first notification information for causing the audio control device to audibly notify a user of a first message related to the printing; and
   a third transmission unit configured to transmit, based on the reception of the predetermined information, second notification information for causing a terminal device outside the audio control device and outside the printing apparatus to notify, through a notification screen, the user of a second message related to the printing and including a predetermined message not included in the first message,
   wherein the predetermined message is varied depending on the printing apparatus.

2. The communication system according to claim 1, further comprising an acquisition unit configured to acquire error information about an error related the printing and occurring in the printing apparatus,
   wherein the first and the second messages are related to the error based on the acquired error information.

3. The communication system according to claim 2, wherein the error is an error occurring in the recording agent used for the printing and held by the printing apparatus.

4. The communication system according to claim 3, wherein the error is a small-ink-amount state or an out-of-ink state.

5. The communication system according to claim 3, wherein the predetermined message is a message indicating identification information about the recording agent held by the printing apparatus, in which the error is occurring, and
   wherein the predetermined message is varied depending on a recording agent about which an error is occurring in the printing apparatus.

6. The communication system according to claim 3, wherein the identification information is a part number about the recording agent held by the printing apparatus, in which the error is occurring.

7. The communication system according to claim 2, wherein the predetermined message is a message indicating a method for resolving the error, and
   wherein the predetermined message is varied depending on which error is occurring in the printing apparatus.

8. The communication system according to claim 2, wherein, in a case where a plurality of errors is occurring in the printing apparatus, a message related to a first error from among the plurality of errors is more preferentially audibly notified to the user as the first message by the audio control device based on the first notification information than a message related to a second error from among the plurality of errors.

9. The communication system according to claim 8, wherein, in a case where the plurality of errors is occurring in the printing apparatus, the first message includes the message related to the first error and does not include the message related to the second error.

10. The communication system according to claim 9, wherein the predetermined message is the message related to the second error, and
wherein the predetermined message is varied depending on which of the second errors is occurring in the printing apparatus.

11. The communication system according to claim 8, further comprising an identification unit configured to identify priorities of the plurality of errors,
wherein a message related to an error to which a higher priority is assigned is more preferentially notified to the user as the message related to the printing apparatus, and
wherein a priority of the first error is higher than a priority of the second error.

12. The communication system according to claim 8, wherein the plurality of errors includes at least one of an error in which a cover of the printing apparatus is open, an error in which the recording medium provided in the printing apparatus has run out, an error in which the recording medium provided in the printing apparatus is jammed within a conveyance path, and an error in which power is not supplied to the printing unit.

13. The communication system according to claim 8, wherein the plurality of errors includes at least one of an error in which an amount of a first recording agent from among a plurality of recording agents included in the printing apparatus is smaller than a first amount and an error in which an amount of a second recording agent from among the plurality of recording agents is larger than the first amount and smaller than a second amount.

14. The communication system according to claim 1, further comprising an information transmission unit configured to, based on a speech instruction, that is different from the predetermined speech instruction, for causing the printing apparatus to perform the printing given to the audio control device, transmit the information for causing the printing apparatus to perform the printing.

15. The communication system according to claim 14, wherein the predetermined speech instruction is an instruction for notifying a state of the printing apparatus.

16. The communication system according to claim 1, further comprising an information transmission unit configured to, based on the predetermined speech instruction given to the audio control device, transmit the information for causing the printing apparatus to perform the printing,
wherein the predetermined speech instruction is an instruction for causing the printing apparatus to perform the printing, and
wherein, when the information for causing the printing apparatus to perform the printing is transmitted, the printing is performed by the printing apparatus.

17. The communication system according to claim 1, wherein the server system includes one or a plurality of servers.

18. The communication system according to claim 1, wherein the audio control device is a smart speaker.

19. The communication system according to claim 1, wherein the predetermined information is received after the terminal device performs association processing for associating a first account associated with the audio control device and a second account associated with the printing apparatus, and
wherein the second notification information is transmitted to the terminal device after the association processing is performed.

20. The communication system according to claim 1, wherein the association processing is second login processing for logging in to the second account to be performed in the terminal device having performed first login processing for logging in to the first account.

21. The communication system according to claim 1, wherein the predetermined information is received after connection processing for connecting the audio control device to an access point, and
wherein the second notification information is transmitted to the terminal device having performed the connection processing.

22. The communication system according to claim 1, wherein the first notification information is transmitted to the audio control device via the access point to which the audio control device is connected by the connection processing.

23. A method for controlling a communication system including a printing apparatus for performing printing by applying a recording agent onto a recording medium via a printing unit, and a server system that communicates with the printing apparatus, the method comprising:
transmitting, information for causing the printing apparatus to perform the printing;
performing the printing based on information for causing the printing apparatus to perform the printing;
receiving predetermined information based on a predetermined speech instruction given to the audio control device;
transmitting, based on a reception of the predetermined information, first notification information for causing the audio control device to audibly notify a user of a first message related to the printing; and
transmitting, based on the reception of the predetermined information, second notification information for causing a terminal device outside the audio control device and outside the printing apparatus to notify, through a notification screen, the user of a second message related to the printing and including a predetermined message not included in the first message, wherein the predetermined message is varied depending on the printing apparatus.

24. A server system that communicates with a printing apparatus for performing printing by applying a recording agent onto a recording medium via a printing unit, the server system comprising:
a reception unit configured to receive predetermined information based on a predetermined speech instruction given to the audio control device;
a first transmission unit configured to transmit, based on a reception of the predetermined information, first notification information for causing the audio control device to audibly notify a user of a first message related to the printing; and
a second transmission unit configured to transmit, based on the reception of the predetermined information, second notification information for causing a terminal device outside the audio control device and outside the printing apparatus to notify, through a notification screen, the user of a second message related to the printing and including a predetermined message not included in the first message, wherein the predetermined message is varied depending on the printing apparatus.

* * * * *